(12) United States Patent
Liang et al.

(10) Patent No.: US 11,352,279 B2
(45) Date of Patent: Jun. 7, 2022

(54) RURAL LANDSCAPE-TYPE NITROGEN AND PHOSPHORUS ECOLOGICAL INTERCEPTION DITCH SYSTEM AND FARMLAND DRAINAGE NITROGEN AND PHOSPHORUS INTERCEPTION METHOD USING THE SAME

(71) Applicant: ZHEJIANG UNIVERSITY, Hangzhou (CN)

(72) Inventors: Xinqiang Liang, Hangzhou (CN); Ziyi Zhao, Hangzhou (CN); Shuang He, Hangzhou (CN); Feng Liu, Hangzhou (CN); Fayong Li, Hangzhou (CN); Junwei Jin, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 16/957,107

(22) PCT Filed: Sep. 18, 2019

(86) PCT No.: PCT/CN2019/106536
§ 371 (c)(1),
(2) Date: Jun. 23, 2020

(87) PCT Pub. No.: WO2020/114039
PCT Pub. Date: Jun. 11, 2020

(65) Prior Publication Data
US 2021/0387881 A1 Dec. 16, 2021

(30) Foreign Application Priority Data
Dec. 4, 2018 (CN) .......................... 201811468836.9

(51) Int. Cl.
*C02F 3/30* (2006.01)
*C02F 1/28* (2006.01)
(Continued)

(52) U.S. Cl.
CPC .............. *C02F 3/303* (2013.01); *C02F 1/283* (2013.01); *C02F 3/305* (2013.01); *C02F 3/308* (2013.01);
(Continued)

(58) Field of Classification Search
CPC .......... C02F 3/303; C02F 1/283; C02F 3/305; C02F 3/308; C02F 3/32; C02F 2101/105;
(Continued)

(56) References Cited

U.S. PATENT DOCUMENTS 5,993,649 A * 11/1999 DeBusk .................... C02F 3/32
210/103
6,277,274 B1 * 8/2001 Coffman .............. B01D 24/205
210/150

(Continued)

FOREIGN PATENT DOCUMENTS

CN 203451288 U 2/2014
CN 206128023 U 4/2017
(Continued)

OTHER PUBLICATIONS

International Search Report (PCT/CN2019/106536); dated Dec. 12, 2019.

*Primary Examiner* — Fred Prince
(74) *Attorney, Agent, or Firm* — W&G Law Group

(57) ABSTRACT

A rural landscape-type nitrogen and phosphorus ecological interception ditch system and a farmland drainage nitrogen and phosphorus interception method using the system are provided. The system includes a sediment buffer zone, an ecological ditch unit, an interception-conversion pool and a field ridge hedge fence; the sediment buffer zone, the ecological ditch unit, and the interception-conversion pool are sequentially arranged in a continuous ditch along a direction of a water flow; and the field ridge hedge fence is
(Continued)

arranged on field ridges on one side or both sides of the ditch. The present disclosure can, on the basis of not affecting normal production functions of a farmland, further exert an ecological role of the farmland, and use the farmland as an assimilation sink for environmental nitrogen and phosphorus, so as to optimize drainage water quality and improve a farmland ecological environment.

10 Claims, 8 Drawing Sheets

(51) Int. Cl.
*E02B 5/08* (2006.01)
*C02F 3/32* (2006.01)
*C02F 101/10* (2006.01)
*C02F 101/16* (2006.01)
*C02F 103/00* (2006.01)

(52) U.S. Cl.
CPC ............... *E02B 5/08* (2013.01); *C02F 3/32* (2013.01); *C02F 2101/105* (2013.01); *C02F 2101/16* (2013.01); *C02F 2103/001* (2013.01); *C02F 2307/00* (2013.01)

(58) Field of Classification Search
CPC ............ C02F 2101/16; C02F 2103/001; C02F 2307/00; E02B 5/08

USPC ............ 210/601, 602, 615, 616, 617, 747.2, 210/747.3, 150, 151, 170.03, 259, 903, 210/906

See application file for complete search history.

(56) References Cited

U.S. PATENT DOCUMENTS

| | | | |
|---|---|---|---|
| 7,361,268 B2* | 4/2008 | Ogden | C02F 3/34 210/150 |
| 8,252,182 B1* | 8/2012 | Chang | B01J 20/16 210/602 |
| 2003/0230529 A1* | 12/2003 | Austin | C02F 3/327 210/602 |
| 2012/0024780 A1* | 2/2012 | Carr | C02F 3/325 210/602 |

FOREIGN PATENT DOCUMENTS

| | | |
|---|---|---|
| CN | 106745692 A | 5/2017 |
| CN | 107512828 A | 12/2017 |
| CN | 109553191 A | 4/2019 |
| CN | 209276229 U | 8/2019 |
| KR | 20120041623 A | 5/2012 |

* cited by examiner

RURAL LANDSCAPE-TYPE NITROGEN AND PHOSPHORUS ECOLOGICAL INTERCEPTION DITCH SYSTEM AND FARMLAND DRAINAGE NITROGEN AND PHOSPHORUS INTERCEPTION METHOD USING THE SAME

CROSS-REFERENCE TO RELATED APPLICATIONS

This is the United States national phase of International Patent Application No. PCT/CN2019/106536, filed on Sep. 18, 2019, which claims priority of Chinese patent application No. 2018114688369, filed on Dec. 4, 2018, the entire contents of Which are incorporated herein by their references.

TECHNICAL FIELD

The present disclosure relates to a rural landscape-type nitrogen and phosphorus ecological interception ditch system and a farmland drainage nitrogen and phosphorus interception method using the system, and belongs to the technical fields of agricultural non-point source pollution control and water environment treatment.

BACKGROUND

Ecological ditch technology is similar to the artificial wetland wastewater treatment technology that is widely used currently, and nitrogen and phosphorus nutrients in farmland drainage in the ditches are intercepted in many forms such as adsorption, absorption, precipitation, filtration and microbial degradation under a combined action of aquatic plants in the ditches and microorganisms in sediments of the ditches. Roots of the aquatic plants can directly absorb ammonia nitrogen, nitrate nitrogen and phosphate in the farmland drainage and promote their exchanges at an interface by breaking an interface balance, thereby accelerating a speed of pollutants entering the sediments and enhancing their interception capacity.

At present, China has a large number of newly constructed and reconstructed ecological ditches, and these ecological ditches play a significant role in non-point source sewage interception treatment, but there are also problems that cannot be ignored:

1) an ordinary ecological ditch has a not-high removal efficiency on the nitrogen and phosphorus pollutants, and it mainly depends on emerging plants in the ditch and microbial communities in the sediments to adsorb and absorb the nitrogen and phosphorus pollutants. Biodiversity is single, ecosystem stability is inadequate and it is susceptible to external influences. Due to limitation of a plant amount, a contact area, a reaction efficiency and a residence time, a removal rate of the nitrogen and phosphorus is generally maintained at about 70%, and a treatment efficiency will decrease after adsorption saturation of the system;

2) the pollutants adsorbed and absorbed in the ordinary ecological ditch is not effectively handled, and when a rainstorm or flood arrives, the pollutants will be reversely released into a water body and the farmland in a form of leaching or dissimilation, thereby causing secondary pollution.

3) the ordinary ecological ditch fails to take "field-ridge-ditch-pool-road" as a unified whole, ecological functions of the farmland have not been effectively developed, and it does not meet construction requirements of beautiful countryside and green ecological corridors.

SUMMARY

In view of the shortcomings that ecosystem functions of an existing farmland are insufficient and interception and purification capabilities of a ditch are weak, an object of the present disclosure is to provide, on the basis of not affecting normal production functions of the farmland and in order to further exert its ecological role, a "field-ridge-ditch-pool-road" compound rural landscape-type ecological ditch nitrogen and phosphorus interception technology.

A specific technical solution adopted in the present disclosure is as follows:

a rural landscape-type nitrogen and phosphorus ecological interception ditch system includes a sediment buffer zone, an ecological ditch unit, an interception-conversion pool and a field ridge hedge fence; the sediment buffer zone, the ecological ditch unit, and the interception-conversion pool are sequentially arranged in a continuous ditch along a direction of a water flow; and the field ridge hedge fence is provided on field ridges along one or both sides of the ditch;

a downward slope is provided at a front end of the sediment buffer zone along a water inflow direction, to form a water-fall zone, and an end of the water-fall zone is connected to a ditch bottom of the ditch; a buffer flow regulating wall perpendicular to the direction of the water flow is provided downstream of the water-fall zone; and the buffer flow regulating wall spans a cross section of the entire ditch, a plurality of through-flow holes is arranged in the buffer flow regulating wall, and a distribution density of the through-flow holes gradually decreases from top to bottom;

the ecological ditch unit includes an embedded nitrification-denitrification-dephosphorization complete treatment device and an aquatic plant community unit; the embedded nitrification-denitrification-dephosphorization complete treatment device is embedded in the ditch, for removing nitrogen and phosphorus from farmland drainage; the aquatic plant community unit is provided in the ditch downstream of the embedded nitrification-denitrification-dephosphorization complete treatment device, a slope-protection support is fixed on a side wall of a ditch section where the aquatic plant community unit is located, and support grids are densely arranged on the slope-protection support, for planting emerging plants and submerged plants;

the interception-conversion pool is disposed and embedded in the ditch, and has a bottom that is lower than the ditch bottom, and a water inlet and a water outlet that are flush with the ditch bottom; an interior of the interception-conversion pool is divided into a catchment area, an adsorption-interception area, and a water storage and drainage area sequentially along the direction of the water flow, a carbon-based filler wall that spans a cross section of a pool body is provided in the adsorption-interception area, and the catchment area and the water storage and drainage area are separated by the carbon-based filler wall so as not to be directly communicated with each other; a shell of the carbon-based filler wall adopts a porous frame, the porous frame has a hollow interior and a water-permeable outer wall, and in an inner cavity thereof, a water-inflow surface, a water-outflow surface and a bottom are respectively laid with a sponge layer; a cavity between the sponge layers is filled with two layers of different fillers, of which a lower part is a percolation layer and an upper part is a carbon-based adsorption filler layer; and the field ridge hedge fence is provided on field ridges along one or both sides of the ditch and a bottom thereof is a pebble zone laid on surfaces of the field ridges, and emerging plants and/or wetland trees and shrubs are planted on the pebble zone.

Preferably, the embedded nitrification-denitrification-dephosphorization complete treatment device has a bottom that is lower than the ditch bottom of the ditch, a water inlet and a water outlet that are flush with the ditch bottom, and a "凵"-shaped water-fall structure at a position of the water inlet; a first baffle plate, a second baffle plate, a third baffle plate, a fourth baffle plate are provided in a tank body of the treatment device, plate surfaces of the four baffle plates are all perpendicular to the direction of the water flow, a flow channel is kept between each baffle plate and a side wall of the device, the flow channels between two adjacent baffle plates and side walls of the device are located on different sides of the device, and an interior of the treatment device forms a "弓"-shaped water flow channel under flow guidance of the four baffle plates; the flow channels at sides of the first baffle plate, the second baffle plate, the third baffle plate, and the fourth baffle plate are provided with a plant growth bag module, an iron-manganese composite oxide film module, a denitrification module, and a phosphorus adsorbing medium module, respectively; the plant growth bag module is composed of ecological concrete and gravel disposed in an ecological bag, and holes for planting emerging plants are provided in a bag body thereof; the iron-manganese composite oxide film module is composed of multi-faceted hollow spheres and gravel disposed in an ecological bag, and the multi-faceted hollow spheres are attached with iron-manganese oxide films; the denitrification module is composed of multi-faceted hollow spheres and gravel disposed in an ecological bag, the multi-faceted hollow spheres being attached or filled with a denitrification substrate; and the phosphorus adsorbing medium module is composed of multi-faceted hollow spheres and gravel disposed in an ecological bag, the multi-faceted hollow spheres being attached or filled with a phosphorus adsorbing medium.

Preferably, a tractor-ploughing road is further included, and the tractor-ploughing road is laid along one or both sides of the rural landscape-type nitrogen and phosphorus ecological interception ditch system; and landscape plants are planted along the tractor-ploughing road.

Preferably, a slope of the water-fall zone has a gradient of 1:1-1:2.

Preferably, the buffer flow regulating wall has a thickness of 20-30 cm, a height of two-thirds of a height of the ditch, and a width same as that of the ditch.

Preferably, the slope-protection support is weaved with wicker or crop straw, and side lengths of the support grids are 20-30 cm.

Preferably, a pool volume of the interception-conversion pool is 1.5-3 m³, and edges and the bottom of the pool are solidified with cement.

Preferably, the carbon-based filler wall has a thickness of 40-60 cm, a top higher than a top of the ditch, and a width same as that of the ditch; the carbon-based adsorption filler layer is composed of rice husk charcoal having a particle size of 3-5 mm and/or bamboo charcoal having a particle size of 5-10 mm; and the percolation layer is graded gravel having a particle size of 3-5 mm.

Preferably, the pebble zone has a width of 0.3-0.5 m, is laid with pebbles having a particle size of 3-10 cm, and maintains a gradient of 3-10%, and the gradient is inclined to one side of the ditch.

Another object of the present disclosure is to provide a farmland drainage nitrogen and phosphorus interception method using the rural landscape-type nitrogen and phosphorus ecological interception ditch system, and the method includes the following steps:

1) inputting farmland drainage that has been converged and collected through drainage ditches into the nitrogen and phosphorus interception system from the sediment buffer zone;

2) cuasing a water flow to pass through the water-fall zone, and dissipating kinetic energy generated by falling of the farmland drainage flow using an increase of a water depth and blocking of the buffer flow regulating wall, so that a flow velocity of the water flow slows down and sediments gradually settle;

3) causing the water flow to continuously flow and enter the embedded nitrification-denitrification-dephosphorization complete treatment device, and performing falling water aeration at the water inlet of the embedded nitrification-denitrification-dephosphorization complete treatment device by using a high-low elevation drop while further dissipating the energy; passing the farmland drainage through the plant growth bag module after the falling water aeration, and absorbing, by emerging plants, organic substances and nutrient salts in the water as nutrients; concurrently, transferring and releasing, by plant root systems, oxygen to make a surrounding microenvironment sequentially aerobic, hypoxic, and anaerobic, and intercepting and removing a part of nitrogen and phosphorus pollutants through a nitrification-denitrification effect and an excessive accumulation effect of phosphorus by microorganisms; after treatment with the plant growth bag module, the farmland drainage entering the iron-manganese composite oxide film module, to catalytically oxidize ammonia nitrogen in the water using an oxidation performance and an adsorption capacity of the iron-manganese composite oxide film, to achieve a removal effect; subsequently oxidizing ammonia nitrogen that is not adsorbed to nitrate and nitrite into the water; after treatment with the iron-manganese composite oxide film module, the farmland drainage entering the denitrification module to undergo denitrification using denitrification bacteria communities enriched in the denitrification module and using the nitrate and nitrite produced previously as electron donors, to reduce nitrate nitrogen to nitrogen gas; after passing through the denitrification module, the farmland drainage passing through the phosphorus adsorbing medium module to allow phosphate in the water body to be adsorbed and removed; and after treatment with the phosphorus adsorbing medium module, discharging the farmland drainage from the outlet of the treatment device to allow the farmland drainage to continue to flow along the ditch into the aquatic plant community unit;

4) when the farmland drainage flows through the aquatic plant community unit, slowing down water flow of the farmland drainage through blocking and sticking effects of emerging plants and submerged plants that are planted on the ditch bottom and ditch walls, such that suspended particles in the water further carry particulate organic pollutants to precipitate and condense on the aquatic plant communities and sediments on the ditch bottom and side walls of the ditch; and adsorbing and degrading, by microorganisms and aquatic plants in the sediments and the water, nitrogen, phosphorus and organic pollutants;

5) after passing through the aquatic plant community unit, the farmland drainage entering the catchment area of the interception-conversion pool and performing adsorption and sedimentation through the carbon-based filler wall; the farmland drainage contacting the carbon-based adsorption filler layer during flowing, so that nitrogen, phosphorus and organic substances in the water body are adsorbed by the carbon-based adsorption filler and then transformed and removed through metabolism of epiphytic microorganisms in the filler; the farmland drainage at the carbon-based adsorption filler layer flowing downwards along the carbon-based filler wall to form a vertical flow and entering the water storage and drainage area through the percolation layer; and filtering and absorbing pollutants again when the farmland drainage passes through the percolation layer; and 6) after treatment with the interception-conversion pool, wastewater continuing to flow along the ditch, to enter other water environments.

The present disclosure can, on the basis of not affecting the normal production functions of the farmland, further exert its ecological role, and use the farmland as an assimilation sink for environmental nitrogen and phosphorus, so as to achieve a purpose of optimizing drainage water quality and improving ecological environment of the farmland. In order to solve the problems that the ecological functions of the existing farmland are insufficient and the interception and purification capabilities of the ditch are weak, the present disclosure optimizes a role of the "field-ridge-ditch-pool-road" in the entire composite system, enriches farmland biodiversity, increases buffering, beautifying and economic functions of the field ridge, improves an environment landscape effect and a pollution self-purification ability of the water body, and caters to needs of beautiful rural construction, striving to build a farmland green ecological corridor and promote green development of the agriculture.

Figure 1:
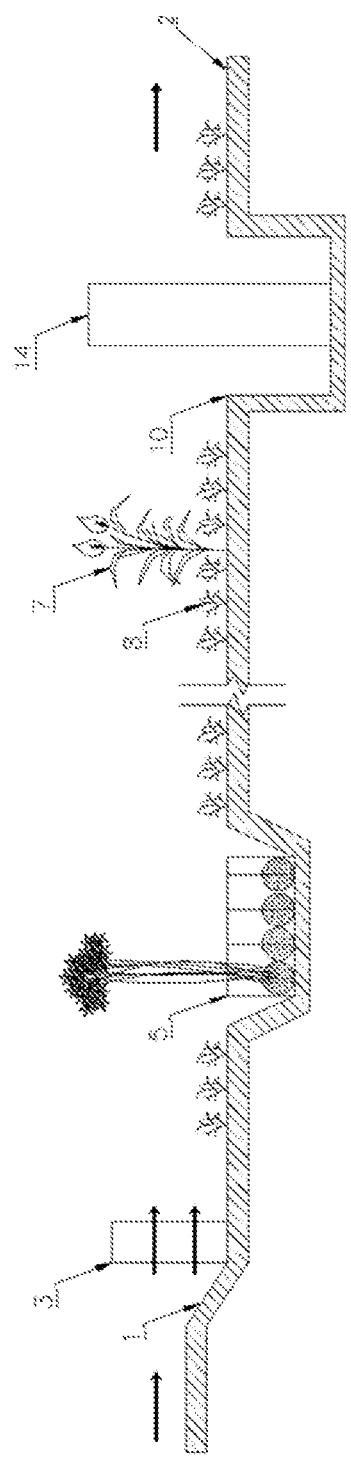
FIG. 1 is a cross-sectional diagram of an ecological ditch according to the present disclosure.

Reference numerals of the present disclosure are as follows:

| 1--water-fall area | 2--ditch bottom |
|---|---|
| 3--buffer flow regulating wall | 4--through-flow hole |
| 5--embedded nitrification-denitrification-dephosphorization complete treatment device | 6--slope-protection support |
| 7--support grid | 8--emerging plant |
| 9--submerged plant | 10--interception-conversion pool |
| 11--catchment area | 12--adsorption-interception area |
| 13--water storage and drainage area | 14--carbon-based filler wall |
| 15--porous plastic frame | 16--sponge |
| 17--carbon-based adsorption filler layer | 18--percolation layer |
| 19--pebble zone | 20--wetland trees and shrubs |

DESCRIPTION OF EMBODIMENTS

The present disclosure is further interpreted and described below with reference to the drawings and specific embodiments. The technical features of various embodiments of the present disclosure can be combined correspondingly under the premise that there is no confliction between each other.

In a preferred embodiment of the present disclosure, a rural landscape-type nitrogen and phosphorus ecological interception ditch system is as shown in FIG. 1. Basic functional units of the rural landscape-type nitrogen and phosphorus ecological interception ditch system can be divided into a sediment buffer zone, an ecological ditch unit, an interception-conversion pool and a field ridge hedge fence. The sediment buffer zone, the ecological ditch unit, and the interception-conversion pool are sequentially arranged in a continuous ditch along a direction of a water flow, while the field ridge hedge fence is provided on field ridges along one or both sides of the ditch. The respective functional units can be constructed by excavating an existing farmland drainage ditch, or corresponding structures are formed through complete re-excavation, but the essence thereof is an ecological ditch having ditch nitrogen and phosphorus capacities. The respective functional units in this system have different functions, and a structure and a role of each of the functional units are described in detail below.

Figure 2:
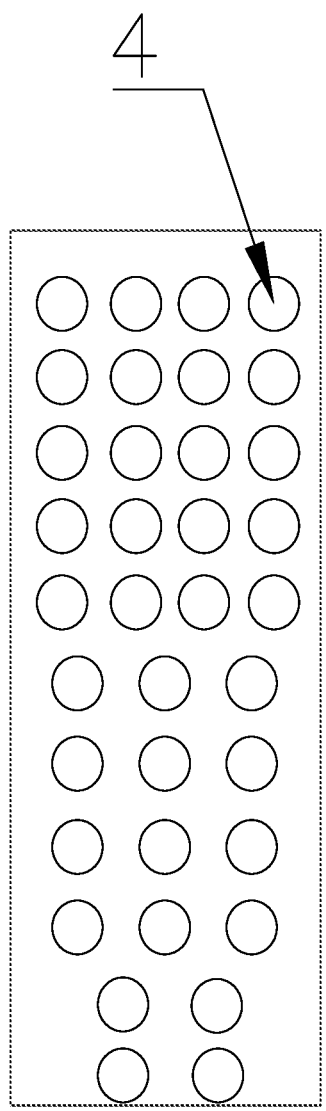
FIG. 2 is a partially enlarged schematic diagram of a buffer flow regulating wall in FIG. 1.
Figure 3:
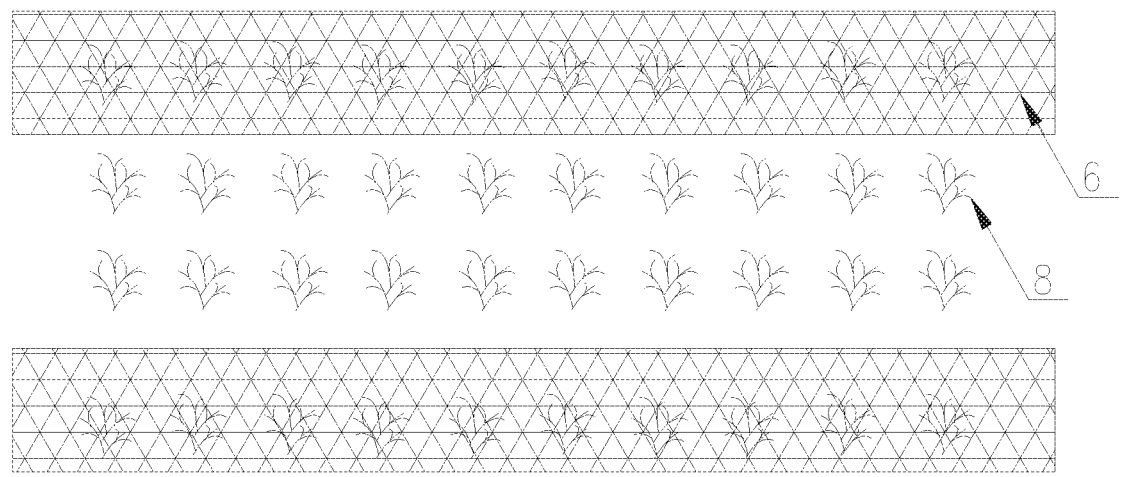
FIG. 3 is a schematic diagram of a slope-protection support in FIG. 1.
Figure 4:
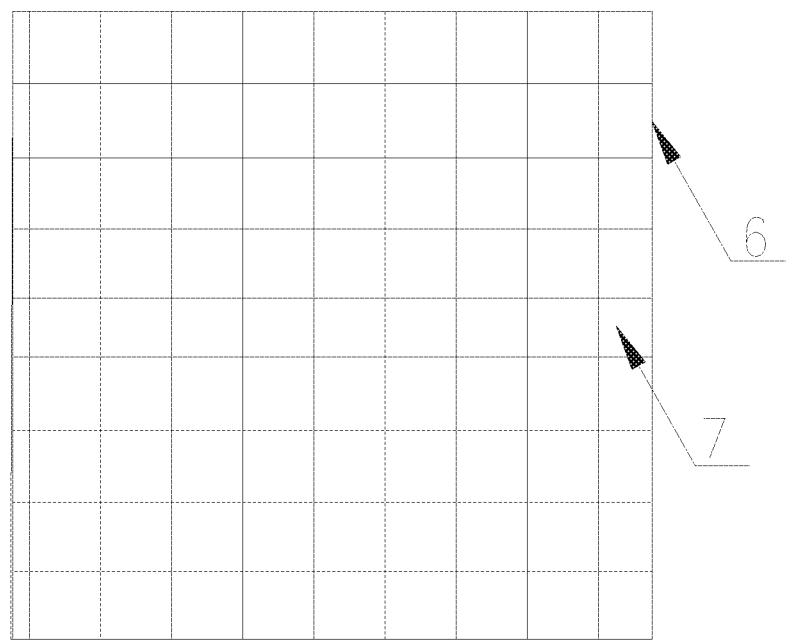
FIG. 4 is a partially enlarged schematic diagram of the slope-protection support in FIG. 3.

The sediment buffer zone is arranged upstream of the ditch and used to reduce a speed of the water flow entering the system, so that the sediment is deposited, preventing subsequent functional units from being blocked. A downward slope is provided at a front end of the sediment buffer zone along a water inflow direction to form a water-fall zone 1. A gradient of the water-fall zone is set 1:1-1:2 according to an actual size of the ditch and water flow conditions. A rear end of the water-fall zone 1 is connected to a ditch bottom 2 of the ditch and is in a same plane as the ditch bottom. A buffer flow regulating wall 3 perpendicular to the direction of the water flow is provided downstream of the water-fall zone 1, and the buffer flow regulating wall 3 spans a cross section of the entire ditch. After the water flow passes through the water-fall zone, since a water depth increases and a flow velocity decreases, buffering is achieved, so that it is more conducive to sediment settlement; the buffer flow regulating wall 3 that is provided behind the water-fall zone 1 and is perpendicular to the reaction of the water flow has a thickness of 20-30 cm, a height of two-thirds of an actual height of the ditch, and a width same as an actual width of the ditch. As shown in FIG. 2, through-flow holes 4 are evenly arranged in the buffer flow regulating wall 3, and the through-flow holes 4 are arranged in a configuration in which a distribution density gradually decreases from top to bottom, so as to achieve a better effect of blocking the sediment to ensure cleanliness of tailwater. The buffer flow regulating wall is used to collide with a shortly accelerated water flow formed by flow falling in the water-fall zone to consume kinetic energy generated by the flow falling, and to slow down the water flow passing through the buffer flow regulating wall and uniform the flow velocity, such that the water flow has deep and slow characteristics under a combined effect of the water-fall zone 1 and the buffer flow regulating wall 3, thereby greatly improving the sedimentation effect of the sediment. The sediment accumulated by the sedimentation can be regularly dredged and removed according to the actual situations, to prevent fluidity of the water flow in the ditch from being blocked.

The ecological ditch unit includes an embedded nitrification-denitrification-dephosphorization complete treatment device 5 and an aquatic plant community unit. The embedded nitrification-denitrification-dephosphorization complete treatment device 5 is located upstream, and the aquatic plant community unit is located downstream.

Figure 9:
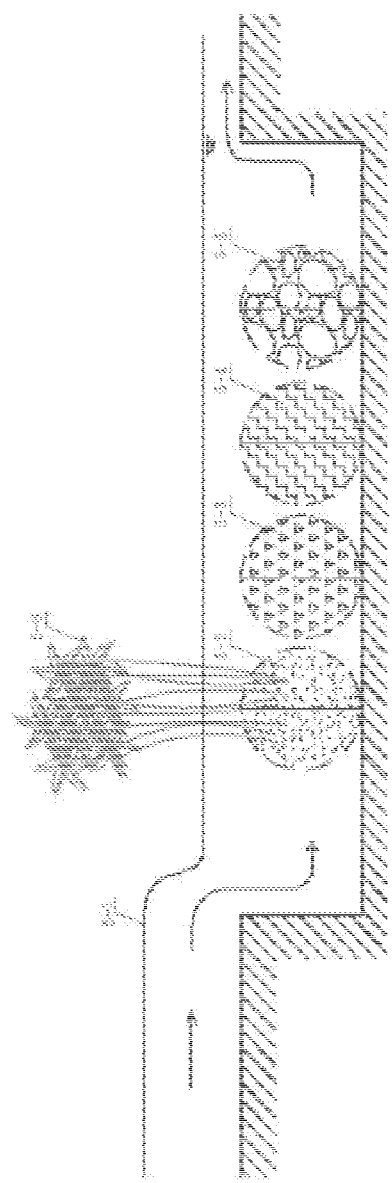
FIG. 9 is a cross-sectional diagram of an embedded nitrification-denitrification-dephosphorization complete treatment device.
Figure 10:
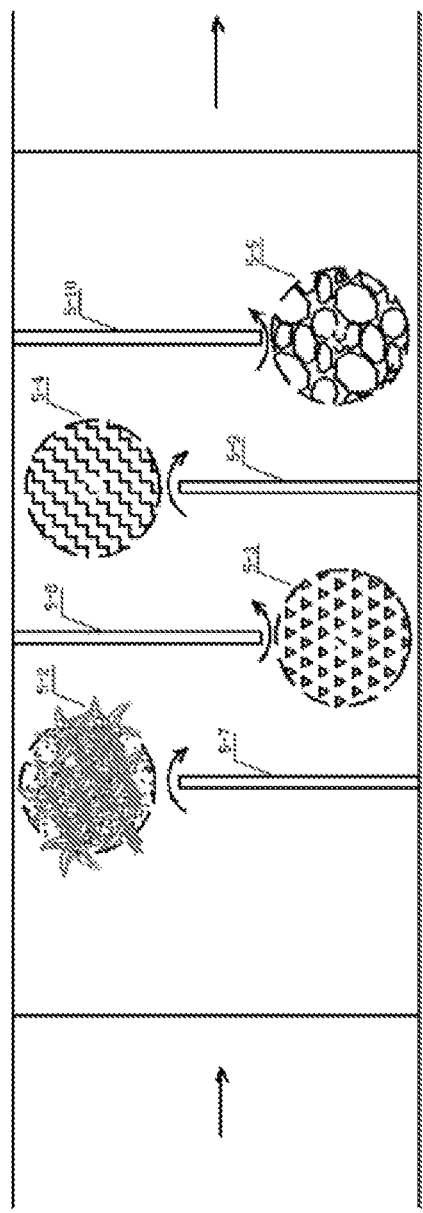
FIG. 10 is a top diagram of an embedded nitrification-denitrification-dephosphorization complete treatment device.

The embedded nitrification-denitrification-dephosphorization complete treatment device 5 is embedded in the ditch, for removing nitrogen and phosphorus from farmland drainage. Its specific structure is shown in FIG. 9 and FIG. 10, and the embedded nitrification-denitrification-dephosphorization complete treatment device 5 is a cube recess formed by further excavating downwards on the basis of the ditch, so a bottom of the device is lower than the ditch bottom 2 of the ditch, and a water inlet and a water outlet of the device are flush with the ditch bottom 2, forming a "凹"-shaped water-fall structure at a position of the water inlet. A position of the water-fall structure may be configured in a manner that the water falls vertically or with a slope having a certain angle of inclination. The gradient of the bottom of the entire device along the direction of the water flow, that is, the inclination slope is 0.3-0.5%, and this gradient enables the water flow to automatically flow under the gravity without additional energy consumption.

A baffle plate A5-7, a baffle plate B5-8, a baffle plate C5-9, and a baffle plate D5-10 are provided in a tank body of the treatment device, and a length of each baffle plate is smaller than a width of a cross section of the recess, so that a flow channel is kept between each baffle plate and a side wall of the device. Adjacent baffle plates are disposed on different side walls of the recess, and the flow channels between two adjacent baffle plates and the side walls of the device are located on two sides of the device, respectively. Therefore, it can be seen from the drawing that a middle-section recess of the treatment device forms an "弓"-shaped water flow channel under guidance of the four baffle plates. The flow channels at sides of the baffle plate A5-7, the baffle plate B5-8, the baffle plate C5-9, and the baffle plate D5-10 are provided with a plant growth bag module 5-2, an iron-manganese composite oxide film module 5-3, a denitrification module 5-4, and a phosphorus adsorbing medium module 5-5, respectively. Each of the modules is wrapped by an ecological bag, to prevent it from being washed away by the water flow. The ecological bags are bags made of water-permeable materials with meshes, such as gunnybags, geotextiles, etc., and different functional module materials are loaded into the bags to perform different functions. Specific arrangements of the different modules are described in detail below one by one.

The plant growth bag module 5-2 consists of ecological concrete, gravel and emerging landscape plants placed in the ecological bag. The gravel is of a certain type, and is disposed in the ecological bag to play a role of stabilizing a position of the bag body to prevent displacement with the water flow, and the gravel in other bags described below also play a similar role. The emerging landscape plants 5-6 are planted on the ecological concrete, and tops thereof protrude out of the bag body through openings in the ecological bag, beyond a water level 5-1, and can be exposed to sunlight. It is recommended that yellow iris or *canna* or the like is used as the emerging landscape plants, so that plant stems can be used to adsorb and absorb pollutants in water, and meanwhile a good ornamental performance is provided. The paddy field drainage carrying sediments firstly passes through the nitrogen and phosphorus rapid coupling plant growth bag containing the emerging plants, and organic substances and N, P and other elements in the water can be intercepted and used by the plant as nutrient substrates, so that a load of a subsequent processing module is reduced. Transferring and releasing of oxygen by plant root systems causes the surrounding microenvironment to sequentially be aerobic, hypoxic and anaerobic, to achieve a purpose and effect of intercepting and removing some pollutants through the nitrification-denitrification and an excessive accumulation of the phosphorus by microorganisms. The iron-manganese composite oxide film module 5-3 is composed of multiple-faceted hollow spheres disposed in an ecological bag, and gravel can be placed in the ecological bag as required. An iron-manganese composite oxide film is attached to or filled in the multiple-faceted hollow spheres. The iron-manganese composite oxide film can be prepared and coated on the multiple-faceted hollow spheres by any method in the related art and can also be compounded on the surface of the multiple-faceted hollow spheres by using commercially available materials. The iron-manganese composite oxide film has an amorphous structure, with main constituent elements being iron, manganese, calcium, oxygen and so on, and since it has a relatively large specific surface area and hydroxyl functional groups, it has a good oxidation performance and an adsorption capacity, and thus can have effective catalytic oxidization of ammonia nitrogen in water to achieve the removal effect. However, due to the limited oxidation and adsorption capacity of the iron-manganese oxide film, the ammonia nitrogen that is not adsorbed is easily oxidized into nitrate and nitrite, which enter into the water and then are further converted into three-cause substances that can cause cancer, malformation and mutations and are harmful to human health, so further treatment is needed subsequently. The denitrification module 5-4 is composed of multi-faceted hollow spheres disposed in an ecological bag, and gravel can also be placed in the ecological bag as required. Denitrification substrate is attached to the multi-faceted hollow spheres. The denitrification substrate is a layer of biofilm or sediments with denitrification bacterium. The multi-faceted hollow spheres may be placed in acclimatized sediments having the denitrification bacterium for a period of time and is taken out and put into the ecological bag after the film is formed. In this embodiment, a part of the denitrification sediments and the multi-faceted hollow spheres are directly mixed and filled in the bag, and then the sediments can be attached and filled in void spaces of the spheres, so that during the treatment process, the surfaces of the multi-faceted hollow spheres will be gradually formed with films. In other embodiments, multi-faceted hollow spheres that have been formed with films in the denitrification zone in a reactor or a sewage treatment facility can also be directly taken and filled into the bag. The phosphorus adsorbing medium module 5-5 is composed of multi-faceted hollow spheres disposed in an ecological bag, and gravel can be placed in the ecological bag as required. A phosphorus adsorbing medium is attached to or filled in the multi-faceted hollow spheres, and the phosphorus adsorbing medium is mainly composed of calcite and phosphate modified products thereof, and removes the phosphate by adsorption. The calcite is a carbonate mineral of which crystals are of a trigonal crystal system, low in cost and easy to obtain, and the product after it adsorbs phosphate can again be used for removing phosphate in water. The calcite can be ground into powder, then kneaded into a spherical shape and filled into cavities of multi-faceted hollow spheres, or it is ground into powder and then sprayed onto surfaces of the multi-faceted hollow spheres.

In the device of this embodiment, the ecological bag used by the respective module has a volume of 0.003-0.005 m$^3$ and has a height that is not beyond the ditch bottom 2. The heights of the tops of the four baffle plates are flush with the ditch bottom 2, and a plate thickness is 1-2 cm. Surfaces of the bottom of the device and the recess wall of the device in the middle-section of the treatment device are rough, to facilitate formation of the film and strengthen the treatment of drainage.

The aquatic plant community unit is provided in the ditch downstream of the embedded nitrification-denitrification-dephosphorization complete treatment device 5, and this unit is reconstructed based on the ditch itself. A slope-protection support 6 is fixed on a side wall of a ditch section where the aquatic plant community unit is located, and support grids 7 are densely arranged on the slope-protection support 6. Emerging plants 8 and submerged plants 9 may be planted in the support grids and the ditch bottom to increase the diversity of animals and plants of the ditch, in order to make the unit form a complete ecological circle of "aquatic plants-micro aquatic animals-microbial community". When the paddy field water flows through the aquatic plant community unit, the water flow is slow and uniform due to blocking and sticking effects of the emerging plants and the submerged plants at the ditch bottom. Through the sedimentation, suspended particles SS in the paddy field water further carry particulate organic pollutants to settle and condense on the aquatic plant communities and sediments at the ditch bottom and the side walls. Active bacteria micelles and aquatic microorganisms in the sediments and the water adsorb organic pollutants through a relatively large specific surface area and absorb, transform, and assimilate the organic pollutants into biomass through metabolism in an aerobic environment, to complete removal of biochemical oxygen demand BOD; whereas the aquatic plants and rhizosphere biospheres that grow depending thereon adsorb nitrogen-containing pollutants and some phosphorus-containing pollutants in the water through root system adsorption and an synergistic effect and transform them into nitrogen gas and organic phosphorus through the nitrification reaction, denitrification reaction, and phosphorus adsorption and release reaction, to complete the removal.

In this embodiment, the slope-protection support is weaved by wicker or crop straw, and a side length of the support grid is 20-30 cm.

Figure 5:
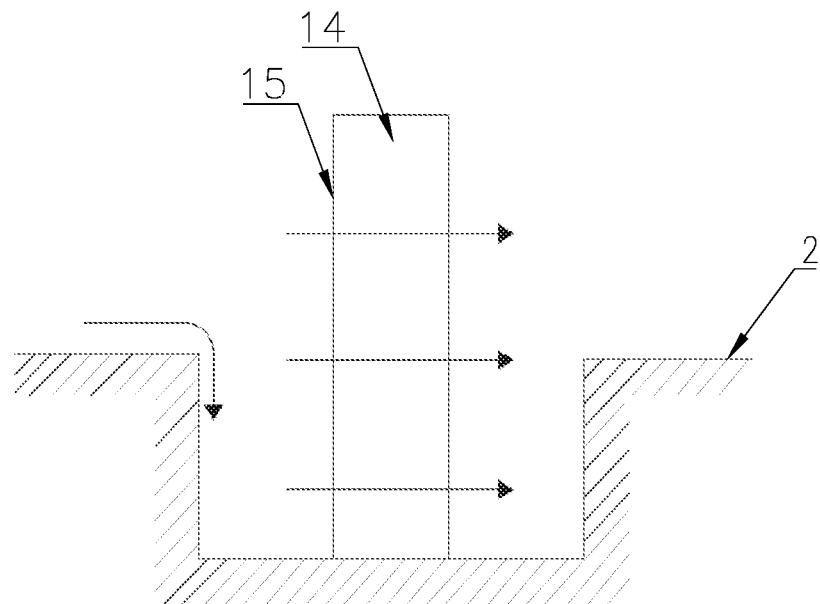
FIG. 5 is a cross-sectional diagram of an interception-conversion pool in FIG. 1.
Figure 6:
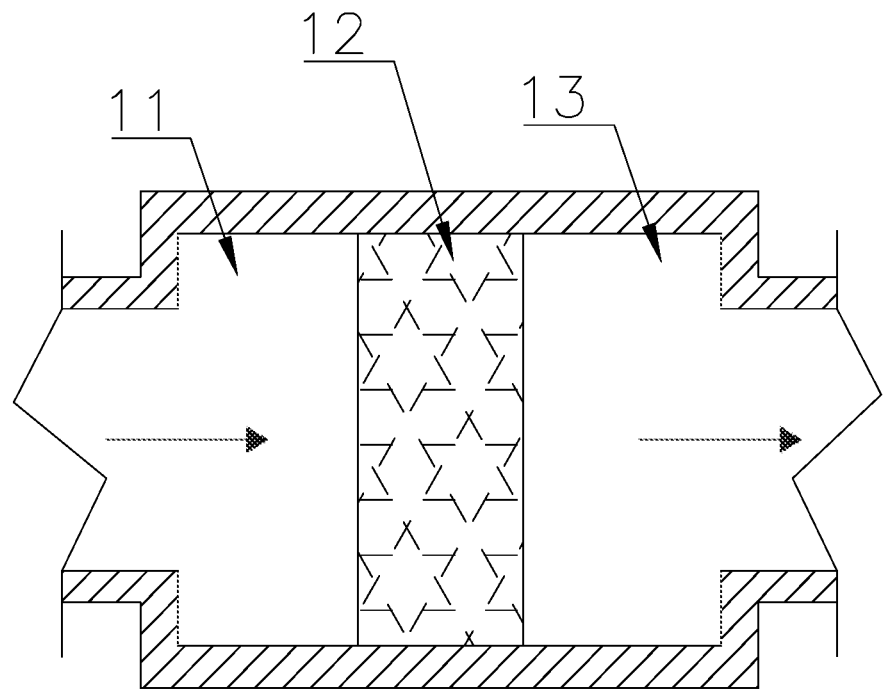
FIG. 6 is a top diagram of an interception-conversion pool in FIG. 1.

Pollutants in the farmland drainage can be blocked and assimilated in the plant ecosystem, but a process of sedimentation and plant absorption is relatively slow. Thus, when a treatment flow rate is relatively large, water discharge requirements cannot be met, so it is necessary to be assisted with other treatment processes to ensure the water discharge effect. In this embodiment, it is achieved by providing the interception-conversion pool 10 at the end of the ditch. The interception-conversion pool 10 is disposed and embedded in the ditch, the interception-conversion pool is connected to the ditch, the bottom of the interception-conversion pool 10 is lower than the ditch bottom 2, and the water inlet and the water outlet of the interception-conversion pool 10 are flush with the ditch bottom 2. According to actual situations of the ditch, a size of the pool volume of the interception-conversion pool to 1.5-3 m$^3$, a pool bottom is lower than the ditch bottom, and edges and the bottom of the pool are solidified with cement. As shown in FIG. 5 and FIG. 6, the pool is divided into three systems, that is, it is sequentially divided into a catchment area 11, an adsorption-interception area 12, and a water storage and drainage area 13 along the direction of the water flow. A carbon-based filler wall 14 that spans a cross section of the pool body is provided in the adsorption-interception area 12, and the catchment area 11 and the water storage and drainage area 13 are separated by the carbon-based filler wall 14 so as not to be directly communicated. The interception-conversion pool 10 adsorbs and assimilates nitrogen and phosphorus in runoff of the paddy field water through the adsorption effect and the nitrogen-phosphorus conversion effect, thereby achieving the purpose of process interception and loss reduction of the nitrogen and phosphorus.

Figure 7:
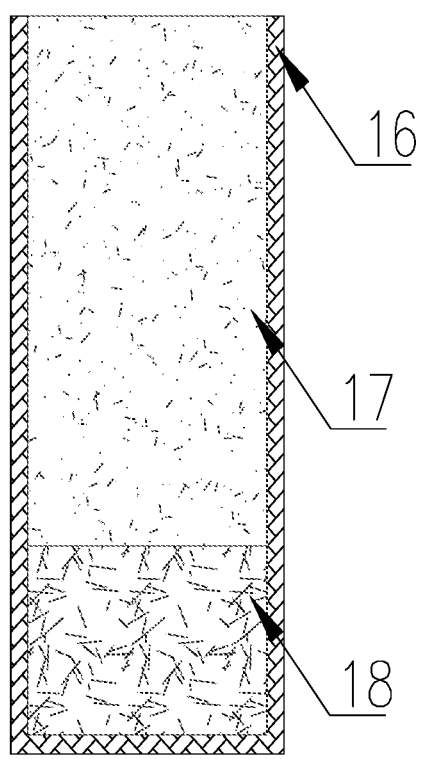
FIG. 7 is a longitudinal sectional diagram of a carbon-based filler wall in FIG. 5.
Figure 8:
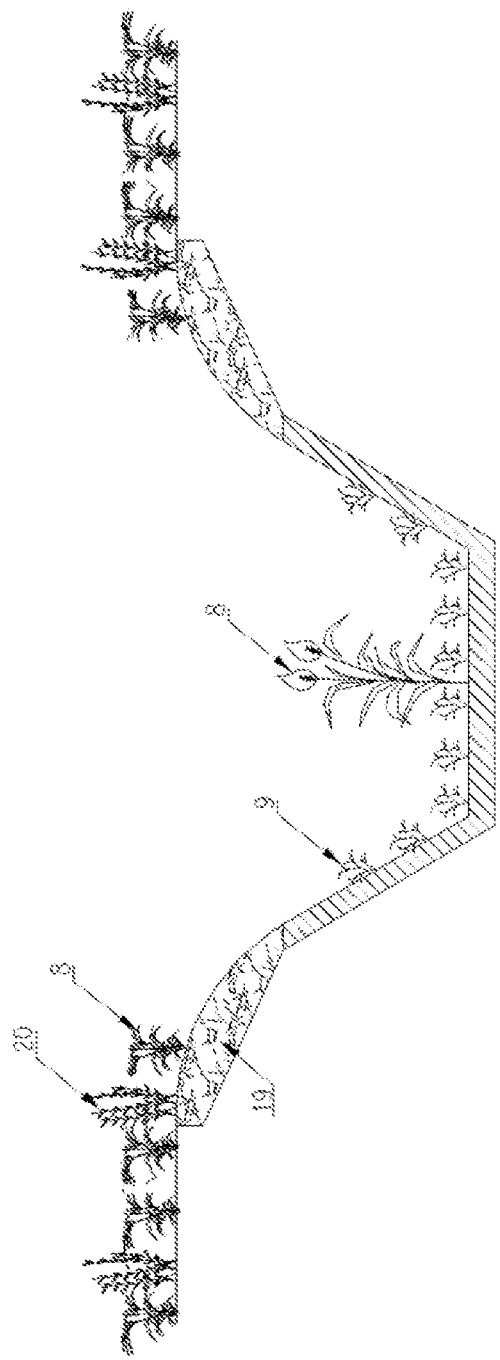
FIG. 8 is a cross-sectional diagram of a field ridge hedge fence.

The carbon-based filler wall has a length of 50 cm and a width same as that of the ditch, and it is slightly higher than the ditch top, so that the paddy field water can fully contact the carbon-based filler wall, to adsorb and settle the pollutants in the water. For the carbon-based filler wall, a movable porous frame 15 made of relatively hard plastic is used as a shell, to facilitate periodical removal and replacement. An interior of the porous frame 15 is hollow, and openings are formed in an outer wall of the porous frame 15 to form a water-permeable structure. The internal structure of the frame is shown in FIG. 7, and in its inner cavity, a water-inflow surface, a water-outflow surface and a bottom are respectively laid with a sponge layer 16 of 2 to 3 cm. If necessary, all surfaces of the inner cavity may be covered by a sponge layer to prevent loss of relatively small filling particles. A cavity between the sponge layers 16 is filled with two layers of different fillers, of which a lower part is a percolation layer 18 and an upper part is a carbon-based adsorption filler layer 17. The percolation layer 18 may be formed by stacking of watertight particulate filter materials, for percolating drainage. The carbon-based adsorption filler layer 17 uses a carbon-based adsorption material, such as conventional activated carbon. In this embodiment, the percolation layer 18 is filled with graded gravel with a particle size of 3-5 mm, and a filling height is one quarter of the height of the carbon-based filler wall. The graded gravel may be preferably composed of a mixture of ceramsite, sandstones and cobblestones with a filling volume ratio of 1:1:1, and has a better percolation and pollutant-discharge effect. The carbon-based adsorption filler layer 17 uses rice husk charcoal having a particle size of 3-5 mm or bamboo charcoal having a particle size of 5-10 mm, and a filling height is three-quarters of the height of the carbon-based filler wall. The two kinds of charcoals can be used individually or in combination, and preferably, the rice husk charcoal and bamboo charcoal are mixed and filled with a volume ratio of 1:2. Of course, specific fillers in the two filler layers can also be adjusted as needed. The percolation layer can cause the suspended pollutants in the water body to be settled and adsorbed, the carbon-based adsorption filler layer can effectively absorb eutrophic pollutants in the water body such as nitrogen and phosphorus, and the nitrogen and phosphorus left on the carbon-based filler wall are transformed by the microorganisms, thereby improving the water treatment effect of the farmland drainage.

Since the percolation layer 18 is located at the bottom in the carbon-based filler wall 14, the farmland drainage will present a horizontal and vertical composite subsurface flow pattern in the adsorption-interception area. A water flow at the top of the carbon-based filler wall 14 will flow downwards along the wall body with the pollutants being adsorbed by the carbon-based filler during the flowing process, and after entering the percolation layer 18, begin to enter the subsequent water storage and drainage area 13 in a form of a horizontal flow. As for the pollutant in the farmland drainage, the organic pollutant particles having different particle sizes are first intercepted by the blocking and screening effect of the filter materials, then adsorbed by the filter material and epiphytic microorganisms in the filter material, and transformed and removed by microbial metabolism. Since the saturated carbon-based material has adsorbed nutrients such as nitrogen and phosphorus, and has enhanced fertility, it can continue to be used for agriculture as fertilizer of non-edible plants or soil conditioner to achieve a purpose of resource utilization.

A field ridge hedge fence is provided on the field ridges along one or both sides of the ditch where the nitrogen and phosphorus interception system is located, and its bottom is a pebble zone 19 laid on a surface of the field ridge. The emerging plants 8 and wetland trees and shrubs 20 are planted on the pebble zone 19. The field ridge hedge fence are provided according to the conditions of the ditch, and it is recommended that pebble zones, emerging plants and wetland trees and shrubs are provided on the field ridges along one or both sides of a ditch that has a relatively large scale, and only pebble zones and emerging plants are laid on the field ridges along one or both sides of a ditch that has a relatively small scale. A width of the pebble zone is set 0.3-0.5 m according to an actual width of the field ridge of the ditch, and the pebble zone is laid with pebbles having a particle size of 3-10 cm, and maintains a slope of 3-10%. The slope is inclined to one side of the ditch, and the pebble zone in the hedge fence are densely planted with plants outwardly as required. The field ridge hedge fence can be used as an ecological protection slope that protects the ditch, and when the ditch is full of water or a flood arrives, the field ridge hedge fence can form a wetland buffer zone together with the ditch, thereby stabilizing soil, controlling a flood, and preventing sewage from outflowing to cause secondary pollution; when a rainstorm occurs, the field ridge hedge fence can not only prevent, through the blocking effect of the pebble zone and the roots, stems and leaves of the plants, the rainstorm from carrying foreign matters to the ditch to lead to blocking or pollution, but also evenly buffer a water volume of the rainstorm, to protect the ditch system. A companion system composed of the field ridge hedge fence and the ecological ditch units can form an ecological community of a relatively high level, which strengthens the paddy field water treatment and also forms good water-front ecological landscapes, thereby meeting construction needs of beautiful ecological fields and farmland green ecological corridors.

After the farmland drainage passes through the respective units above, the sediments therein are effectively settled, whereas organic substances, such as the nitrogen and phosphorus, which are likely to cause eutrophication, are also efficiently removed, and the drainage can continue to enter other water environments along the ditch.

Without doubt, in another embodiment, tractor-ploughing roads that serve as roadways can also be constructed on both sides of the ecological ditch. Ecological corridors are constructed on both sides or one side of the tractor-ploughing road, and plant types, population structures, plant spacings, zone widths, and zone spacing parameters of the ecological corridor are determined according to different regions: a spacing between trees is generally 1.5-2 m, a shrub is planted between two trees, and a grass zone is planted under the shrubs, a width of the grass zone is 0.5-1 m, specifically determined by the width of the tractor-ploughing road; trees, shrubs, and herbaceous plants are planted in combination to achieve biodiversity while achieving nitrogen and phosphorus enrichment and plant landscape economic effects.

In the present disclosure, the plants planted in the entire system can be determined as needed. The emerging plants include, but are not limited to, reeds, cattails, acorns calamus, and *canna*; the submerged plants include, but are not limited to, *Vallisneria asiatica*, hornwort, *myriophyllum*, and najas minor; the herbaceous plants include, but are not limited to, reeds, cattails, acorns calamus, and *canna*; the wetland trees and shrubs include, but are not limited to, cattail, hibiscus, *Yucca gloriosa*, and *wisteria*. When selecting species, a ratio of indigenous plants is increased as many as possible and introduction of the wetland plants to disrupt existing local ecological balance is avoided, and the planting ratio should be determined according to local conditions.

Plants in the ecological ditch units and the field ridges need to be harvested every autumn, and the plants are treated by anaerobic composting, poultry feeding, and economic plant deep processing and the like, to prevent secondary pollution caused by release of the nitrogen and phosphorus pollutants and to achieve environmental and economic benefits, to give back to the society.

Based on the nitrogen and phosphorus interception system, the farmland drainage can be intercepted and transformed. Moreover, in the nitrogen and phosphorus interception system, the number of each different unit may be set one as shown in FIG. 1, or more than one at different positions along a flow path of the farmland drainage ditch. A method for intercepting and transforming the farmland drainage based on the nitrogen and phosphorus interception system is described in detail below, and includes the following steps:

1) after the farmland drainage is converged and collected through a ditch, it is input to the nitrogen and phosphorus interception system from the sediment buffer zone;

2) a water flow is caused to pass through the water-fall zone, and kinetic energy generated by falling of the farmland drainage is dissipated due to increase of a water depth and blocking of the buffering flow regulating wall 3, so that a flow velocity of the water flow slows down and sediments gradually settle;

3) the water flow is caused to continuously flow and enter the embedded nitrification-denitrification-dephosphorization complete treatment device 5, and perform falling water aeration at the water inlet of the complete treatment device 5 by using a high-low elevation drop while further dissipating the energy; the farmland drainage passes through the plant growth bag module 5-2 after the falling wateraeration and organic substances and nutrient salts in the water are absorbed by emerging plants as nutrients; concurrently, plant root systems transfer and release oxygen to make a surrounding microenvironment sequentially be aerobic, hypoxic, and anaerobic, and a part of nitrogen and phosphorus pollutants is intercepted and removed through a nitrification-denitrification effect and an excessive accumulation effect of the phosphorus by microorganisms; after treatment with the plant growth bag module 5-2, the farmland drainage enters the iron-manganese composite oxide film module 5-3, and ammonia nitrogen in the water are catalytically oxidized using an oxidation performance and an adsorption capacity of the iron-manganese composite oxide film, to achieve a removal effect; ammonia nitrogen that is not adsorbed is subsequently oxidized to nitrate and nitrite into the water; after treatment with the iron-manganese composite oxide film module 5-3, the farmland drainage enters a denitrification module 5-4, and nitrate nitrogen is reduced to nitrogen gas through denitrification by using denitrification bacteria communities enriched in the denitrification module and using the nitrate and nitrite produced previously as electron donors; after passing through the denitrification module 5-4, the farmland drainage passes through a phosphorus adsorbing medium module 5-5 to allow phosphate in the water body to be adsorbed and removed; after the treatment with the phosphorus adsorbing medium module 5-5, the farmland drainage is discharged from the outlet of the treatment device and continues to flow along the ditch into the aquatic plant community unit;

4) when the farmland drainage flows through the aquatic plant community unit, flowing of the water flow is slowed down by a blocking and sticking effects of emerging plants and submerged plants that are planted on the ditch bottom and ditch walls, such that suspended particles in the water further carry particulate organic pollutants to precipitate and condense on the aquatic plant communities and sediments on the ditch bottom and side walls of the ditch; and microorganisms and aquatic plants in the sediments and the water adsorb and degrade nitrogen, phosphorus and organic pollutants;

5) after passing through the aquatic plant community unit, the farmland drainage enters the catchment area 11 of the interception-conversion pool 10 and performs adsorption and sedimentation through the carbon-based filler wall 14; the farmland drainage contacts the carbon-based adsorption filler layer 17 during flowing, so that nitrogen, phosphorus and organic substances in the water body are adsorbed by the carbon-based adsorption filler and then transformed and removed through metabolism by epiphytic microorganisms in the filler; the farmland drainage at the carbon-based adsorption filler layer 17 flows downwards along the carbon-based filler wall 14 to form a vertical flow and enters the water storage and drainage area 13 through the percolation layer 18; and when the farmland drainage passes through the percolation layer 18, pollutants are filtered and absorbed again;

6) after treatment with the interception-conversion pool 10, wastewater continues to flow along the ditch, to enter other water environments for irrigation or to be discharged into rivers and lakes.

The embodiments described above are only preferred solutions of the present disclosure, but are not intended to limit the present disclosure. Those of ordinary skill in the related art may make various changes and modifications without departing from the spirit and scope of the present disclosure. Therefore, any technical solution obtained by adopting an equivalent replacement or equivalent transformation falls within the protection scope of the present disclosure.

What is claimed is:

1. A rural landscape-type nitrogen and phosphorus ecological interception ditch system, comprising a sediment buffer zone, an ecological ditch unit, an interception-conversion pool and a field ridge hedge fence, wherein the sediment buffer zone, the ecological ditch unit, and the interception-conversion pool are sequentially arranged in a continuous ditch along a direction of a water flow; and the field ridge hedge fence is provided on field ridges along one or both sides of the ditch;

wherein a downward slope is provided at a front end of the sediment buffer zone along a water inflow direction, to form a water-fall zone, and an end of the water-fall zone is connected to a ditch bottom of the ditch; a buffer flow regulating wall perpendicular to the direction of the water flow is provided downstream of the water-fall zone; and the buffer flow regulating wall spans a cross section of the entire ditch, a plurality of through-flow holes is arranged in the buffer flow regulating wall, and a distribution density of the through-flow holes decreases from top to bottom;

wherein the ecological ditch unit comprises an embedded nitrification-denitrification-dephosphorization complete treatment device and an aquatic plant community unit; the embedded nitrification-denitrification-dephosphorization complete treatment device is embedded in the ditch, for removing nitrogen and phosphorus from farmland drainage; the aquatic plant community unit is provided in the ditch downstream of the embedded nitrification-denitrification-dephosphorization complete treatment device, a slope-protection support is fixed on a side wall of a ditch section where the aquatic plant community unit is located, and support grids are densely arranged on the slope-protection support, for planting emerging plants and submerged plants;

wherein the interception-conversion pool is provided in the embedded ditch, and has a bottom that is lower than the ditch bottom, and a water inlet and a water outlet that are flush with the ditch bottom; an interior of the interception-conversion pool is divided into a catchment area, an adsorption-interception area, and a water storage and drainage area sequentially along the direction of the water flow, a carbon-based filler wall that spans a cross section of a pool body is provided in the adsorption-interception area, and the catchment area—and the water storage and drainage area are separated by the carbon-based filler wall so as not to be directly communicated with each other; a shell of the carbon-based filler wall adopts a porous frame, the porous frame has a hollow interior and a water-permeable outer wall, and in an inner cavity thereof, a water-inflow surface, a water-outflow surface and a bottom are respectively laid with a sponge layer; a cavity between the sponge layers is filled with two layers of different fillers, of which a lower part is a percolation layer and an upper part is a carbon-based adsorption filler layer; and wherein the field ridge hedge fence is provided on the field ridges along one or both sides of the ditch and a bottom thereof is a pebble zone laid on surfaces of the field ridges, and emerging plants and/or wetland trees and shrubs are planted on the pebble zone.

2. The rural landscape-type nitrogen and phosphorus ecological interception ditch system according to claim 1, wherein the embedded nitrification-denitrification-dephosphorization complete treatment device has a bottom that is lower than the ditch bottom of the ditch, a water inlet and a water outlet that are flush with the ditch bottom, and a "凹"-shaped water-fall structure formed at a position of the water inlet; a first baffle plate, a second baffle plate, a third baffle plate, and a fourth baffle plate are provided in a tank body of the treatment device, plate surfaces of the four baffle plates are all perpendicular to the direction of the water flow, a flow channel is kept between each baffle plate and a side wall of the device, the flow channels between two adjacent baffle plates and side walls of the device are located on different sides of the device, and an interior of the treatment device forms a "弓"-shaped water flow channel under flow guidance of the four baffle plates; the flow channels at sides of the first baffle plate, the second baffle plate, the third baffle plate, and the fourth baffle plate are provided with a plant growth bag module, an iron-manganese composite oxide film module, a denitrification module, and a phosphorus adsorbing medium module, respectively; the plant growth bag module is composed of ecological concrete and gravel disposed in an ecological bag, and holes for planting emerging plants are provided in a bag body thereof; the iron-manganese composite oxide film module is composed of multi-faceted hollow spheres and gravel disposed in an ecological bag, the multi-faceted hollow spheres being attached with iron-manganese oxide films; the denitrification module is composed of multi-faceted hollow spheres and gravel disposed in an ecological bag, the multi-faceted hollow spheres being attached or filled with a denitrification substrate; and the phosphorus adsorbing medium module is composed of multi-faceted hollow spheres and gravel disposed in an ecological bag, the multi-faceted hollow spheres being attached or filled with a phosphorus adsorbing medium.

3. The rural landscape-type nitrogen and phosphorus ecological interception ditch system according to claim 1, further comprising a tractor-ploughing road, wherein the tractor-ploughing road is laid along one or both sides of the rural landscape-type nitrogen and phosphorus ecological interception ditch system; and landscape plants are planted along the tractor-ploughing road.

4. The rural landscape-type nitrogen and phosphorus ecological interception ditch system according to claim 1, wherein a slope of the water-fall zone has a gradient of 1:1-1:2.

5. The rural landscape-type nitrogen and phosphorus ecological interception ditch system according to claim 1, wherein the buffer flow regulating wall has a thickness of 20-30 cm, a height of two-thirds of a height of the ditch, and a width same as that of the ditch.

6. The rural landscape-type nitrogen and phosphorus ecological interception ditch system according to claim 1, wherein the slope-protection support is weaved with wicker or crop straw, and side lengths of the support grids are 20-30 cm.

7. The rural landscape-type nitrogen and phosphorus ecological interception ditch system according to claim 1, wherein a pool volume of the interception-conversion pool is 1.5-3 m$^3$, and edges and the bottom of the pool are solidified with cement.

8. The rural landscape-type nitrogen and phosphorus ecological interception ditch system according to claim 1, wherein the carbon-based filler wall has a thickness of 40-60 cm, a top higher than a top of the ditch, and a width same as that of the ditch; the carbon-based adsorption filler layer is composed of rice husk charcoal having a particle size of 3-5 mm and/or bamboo charcoal having a particle size of 5-10 mm; and the percolation layer is graded gravel having a particle size of 3-5 mm.

9. The rural landscape-type nitrogen and phosphorus ecological interception ditch system according to claim 1, wherein the pebble zone has a width of 0.3-0.5 m, is laid with pebbles having a particle size of 3-10 cm, and maintains a gradient of 3-10%, and the gradient is inclined to one side of the ditch.

10. A farmland drainage nitrogen and phosphorus interception method using the rural landscape-type nitrogen and phosphorus ecological interception ditch system according to claim 3, the farmland drainage nitrogen and phosphorus interception method comprising the following steps:
1) inputting farmland drainage that has been converged and collected through drainage ditches into the nitrogen and phosphorus interception system from the sediment buffer zone;
2) causing a water flow to pass through the water-fall zone, and dissipating kinetic energy generated by falling of the farmland drainage by using an increase of a water depth and blocking of the buffer flow regulating wall, so that a flow velocity of the water flow slows down and sediments settle;
3) causing the water flow to continuously flow and enter the embedded nitrification-denitrification-dephosphorization complete treatment device, and performing falling water aeration at the water inlet of the embedded nitrification-denitrification-dephosphorization complete treatment device by using a high-low elevation drop while further dissipating the energy; passing the farmland drainage through the plant growth bag module after the falling water aeration, and absorbing, by emerging plants, organic substances and nutrient salts in the water as nutrients; concurrently, transferring and releasing, by plant root systems, oxygen to make a surrounding microenvironment sequentially aerobic, hypoxic, and anaerobic, and intercepting and removing a part of nitrogen and phosphorus pollutants through a nitrification-denitrification effect and an excessive accumulation effect of phosphorus by microorganisms; after treatment with the plant growth bag module, the farmland drainage entering the iron-manganese composite oxide film module, to catalytically oxidize ammonia nitrogen in the water using an oxidation performance and an adsorption capacity of the iron-manganese composite oxide film, to achieve a removal effect; subsequently oxidizing ammonia nitrogen that is not adsorbed to nitrate and nitrite into the water; after treatment with the iron-manganese composite oxide film module, the farmland drainage entering the denitrification module to undergo denitrification using denitrification bacteria communities enriched in the denitrification module and using the nitrate and nitrite produced previously as electron donors, to reduce nitrate nitrogen to nitrogen gas; after passing through the denitrification module, the farmland drainage passing through the phosphorus adsorbing medium module to allow phosphate in the water body to be adsorbed and removed; and after treatment with the phosphorus adsorbing medium module, discharging the farmland drainage from the outlet of the treatment device to allow the farmland drainage to continue to flow along the ditch into the aquatic plant community unit;
4) when the farmland drainage flows through the aquatic plant community unit, slowing down water flow of the farmland drainage through blocking and sticking effects of emerging plants and submerged plants that are planted on the ditch bottom and ditch walls, such that suspended particles in the water further carry particulate organic pollutants to precipitate and condense on the aquatic plant communities and sediments on the ditch bottom and side walls of the ditch; and adsorbing and degrading, by microorganisms and aquatic plants in the sediments and the water, nitrogen, phosphorus and organic pollutants;
5) after passing through the aquatic plant community unit, the farmland drainage entering the catchment area of the interception-conversion pool and performing adsorption and sedimentation through the carbon-based filler wall; the farmland drainage contacting the carbon-based adsorption filler layer during flowing, so that nitrogen, phosphorus and organic substances in the water body are adsorbed by the carbon-based adsorption filler and then transformed and removed through metabolism of epiphytic microorganisms in the filler; the farmland drainage at the carbon-based adsorption filler layer flowing downwards along the carbon-based filler wall to form a vertical flow and entering the water storage and drainage area through the percolation layer; and filtering and absorbing pollutants again when the farmland drainage passes through the percolation layer; and 6) after treatment with the interception-conversion pool, wastewater continuing to flow along the ditch, to enter other water environments.

\* \* \* \* \*